W. J. ORR.
Car-Coupling.
No. 213,928.    Patented April 1, 1879.
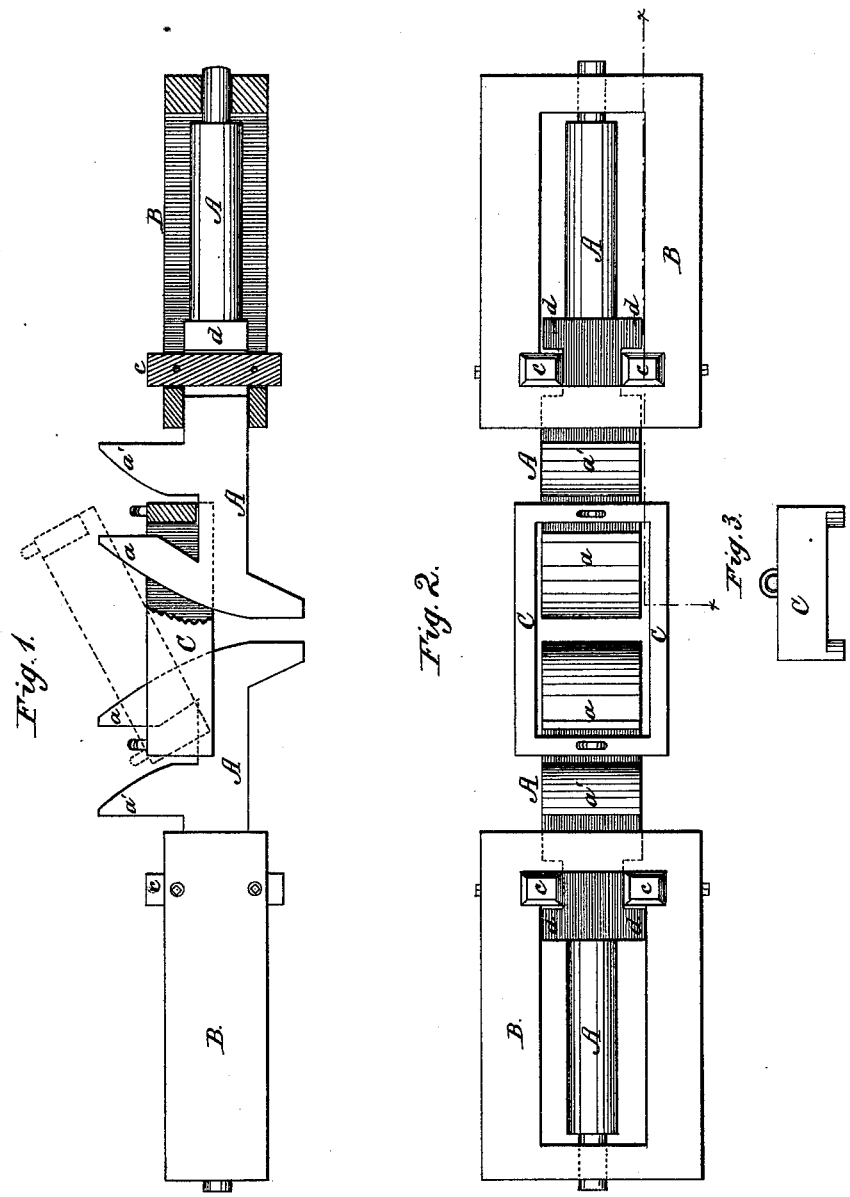
WITNESSES:
W. W. Hollingsworth
Amos W. Hart
INVENTOR:
Wm. J. Orr
BY
ATTORNEYS.

UNITED STATES PATENT OFFICE.

WILLIAM J. ORR, OF ROCK HILL, SOUTH CAROLINA.

IMPROVEMENT IN CAR-COUPLINGS.

Specification forming part of Letters Patent No. 213,928, dated April 1, 1879; application filed February 1, 1879.

*To all whom it may concern:*

Be it known that I, WILLIAM J. ORR, of Rock Hill, in the county of York and State of South Carolina, have invented a new and Improved Car-Coupling; and I do hereby declare that the following is a full, clear, and exact description of the same.

My invention is an improvement in the class of automatic and self-detaching couplings.

The principal feature of the device is a bumper having a recess in its upper side, which adapts it to receive a link of approximately rectangular form, and to hold such link horizontal for engaging with another bumper of similar construction, or to become detached from the link in case a car jumps the track.

In the accompanying drawings, forming part of this specification, Figure 1 is, in part, a side view, and, in part, a longitudinal section, of my improved coupling. Fig. 2 is a plan. Fig. 3 is an end view of the link.

A A indicate the bumpers, which are constructed of wrought-iron, and slide in frames B, designed to be attached to the under side of a car. Each bumper A is provided on the upper side with two horns, $a$ $a'$, between which is the recess for receiving the end of the link C. The said horns are beveled or inclined on their front sides and vertical on the rear side, except that the front horn, $a$, is cut under at the bottom to facilitate uncoupling, as hereinafter described.

The lower edge of the ends of the link C and the lower inner corners of the side bars of the link are cut away to facilitate coupling.

To couple cars provided with my improvement, the link C is placed in the recess between the horns $a$ $a'$ of one of the bumpers A, and will thus be held horizontal, as shown in full lines, Fig. 1. When the cars are pushed together, the free end of the link will ride up the inclined face of the horn $a$ of the opposite bumper, (see dotted lines, Fig. 1,) and fall into the space behind it, thus completing the coupling automatically.

To uncouple, one end of the link C is raised and the cars separated.

If a car jumps the track or falls upon the sleepers by any accident, the link will be lifted out of the recess in its bumper, and the uncoupling will thus be automatically effected.

Both in coupling and uncoupling, the lower edge of the end portion of the link enters the undercut cavity in the base of the front horn $a$, as shown.

Each bumper A has a limited endwise movement, being arrested by the rear horn, $a'$, or lateral ribs $d$. The latter come in contact with detachable abutments $c$ $c$, which are secured in notches in the frame B by means of screw-bolts. The abutments may be conveniently replaced when battered or worn out, or others of less thickness may be substituted in case it should be desired to give the bumper more play.

I do not claim bumpers or draw-heads having horns with which a rectangular link engages, since I am aware such combination of parts is not new.

What I claim is—

1. The combination of the bumpers, each having the horns $a$ $a'$, arranged as specified, and the link constructed with vertical end portions, adapted to fit in the recesses between the horns, so as to support the link horizontally, as and for the purpose specified.

2. The combination of the link C and the two bumpers, each having a recess in its upper side, and having also a front horn, which is beveled on its face, and provided with an undercut rear cavity at the base thereof, as shown and described, for the purpose specified.

WILLIAM JOAB ORR.

Witnesses:
D. HUTCHISON,
JNO. R. LOUDON.